(12) United States Patent
Greathouse et al.

(10) Patent No.: US 10,067,710 B2
(45) Date of Patent: Sep. 4, 2018

(54) DETECTING BUFFER OVERFLOWS IN GENERAL-PURPOSE GPU APPLICATIONS

(71) Applicant: Advanced Micro Devices, Inc., Sunnyvale, CA (US)

(72) Inventors: Joseph L. Greathouse, Austin, TX (US); Christopher D. Erb, Austin, TX (US); Michael G. Collins, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 0 days.

(21) Appl. No.: 15/360,518

(22) Filed: Nov. 23, 2016

(65) Prior Publication Data
US 2018/0143781 A1    May 24, 2018

(51) Int. Cl.
*G06F 3/06* (2006.01)
*G06F 9/44* (2018.01)
*G06T 1/20* (2006.01)
*G06T 1/60* (2006.01)
*G06F 9/451* (2018.01)

(52) U.S. Cl.
CPC .......... *G06F 3/0647* (2013.01); *G06F 3/0619* (2013.01); *G06F 3/0656* (2013.01); *G06F 3/0685* (2013.01); *G06F 9/4443* (2013.01); *G06F 9/451* (2018.02); *G06T 1/20* (2013.01); *G06T 1/60* (2013.01)

(58) Field of Classification Search
CPC ................................. G06F 21/52; G06F 21/54
See application file for complete search history.

(56) References Cited

U.S. PATENT DOCUMENTS

| | | | |
|---|---|---|---|
| 8,928,680 B1* | 1/2015 | Sanketi | G06F 9/5011 345/541 |
| 2008/0140884 A1* | 6/2008 | Enbody | G06F 21/54 710/57 |
| 2013/0124917 A1* | 5/2013 | Das | G06F 11/1438 714/6.12 |

OTHER PUBLICATIONS

Price, J. et al., "Oclgrind: An Extensible OpenCL Device Simulator," Proceedings of the 3rd International Workshop on OpenCL, May 12-13, 2015, 7 pgs., Article No. 12, ACM, Palo Alto, CA, USA.
Pulo, K., "Fun with LD_PRELOAD," Presented at linux.conf.au, Jan. 19-24, 2009, 153 pgs., The Australian National University, Hobart, Tasmania.

(Continued)

*Primary Examiner* — Edward J Dudek, Jr.
(74) *Attorney, Agent, or Firm* — Volpe and Koenig, P.C.

(57) ABSTRACT

A processing apparatus is provided that includes a plurality of memory regions each corresponding to a memory address and configured to store data associated with the corresponding memory address. The processing apparatus also includes an accelerated processing device in communication with the memory regions and configured to determine a request to allocate an initial memory buffer comprising a number of contiguous memory regions, create a new memory buffer comprising one or more additional memory regions adjacent to the contiguous memory regions of the initial memory buffer, assign one or more values to the one or more additional memory regions and detect a change to the one or more values at the one or more additional memory regions.

18 Claims, 4 Drawing Sheets

(56) References Cited

OTHER PUBLICATIONS

Putnam, A. et al., "A Reconfigurable Fabric for Accelerating Large-Scale Datacenter Services," Proceedings of the 41st Annual International Symposium on Computer Architecture, Jun. 14-18, 2014, pp. 13-24, IEEE Press, Minneapolis, MN, USA.
Serebryany, K. et al., "AddressSanitizer: A Fast Address Sanity Checker," Proceedings of the 2012 USENIX Annual Technical Conference, Jun. 13-15, 2012, pp. 28-38, USENIX Association, Boston, MA, USA.
Seward, J. et al., "Using Valgrind to Detect Undefined Value Errors with Bit-Precision," Proceedings of the USENIX Annual Technical Conference, Apr. 10-15, 2005, pp. 2-15, USENIX Association, Anaheim, CA, USA.
Smith, R. "HSA Foundation Update: More HSA Hardware Coming Soon," http://www.anandtech.com/show/9690/hsa-foundation-update-more-hsa-hardware-coming-soon, Oct. 6, 2015, 4 pgs. Accessed Feb. 13, 2017.
Stephenson, M. et al., "Flexible Software Profiling of GPU Architectures," Proceedings of the 42nd Annual International Symposium on Computer Architecture, Jun. 13-17, 2015, pp. 185-197, ACM, Portland, OR, USA.
Stratton, J. et al., "Parboil: A Revised Benchmark Suite for Scientific and Commercial Throughput Computing," Impact Technical Report, IMPACT-12-01, University of Illinois at Urbana-Champaign, Center for Reliable and High-Performance Computing, Mar. 2, 2012, 12 pgs., USA.
Vesely, J. et al., "Observations and Opportunities in Architecting Shared Virtual Memory for Heterogeneous Systems," 2016 IEEE International Symposium on Performance Analysis of Systems and Software, Apr. 17-19, 2016, pp. 161-171, Uppsala, Sweden.
Watson, G., "Dmalloc—Debug Malloc Lilbrary," http://dmalloc.com/, 1992. Accessed Feb. 13, 2017.
Wu, L. et al., "Q100: The Architecture and Design of a Database Processing Unit," Proceedings of the 19th International Conference on Architectural Support for Programming Languages and Operating Systems, Mar. 1-5, 2014, pp. 255-268, ACM, Salt Lake City, UT, USA.
Advanced Micro Devices, Inc., "Asynchronous Shaders: Unlocking the Full Potential of the GPU", 2015, 10 pgs., White Paper, USA.
Advanced Micro Devices, Inc., AMD APP SDK OpenCL Optimization Guide, Rev. 1.0, Aug. 2015, 180 pgs., USA.
Ahn, J. et al., "A Scalable Processing-in-Memory Accelerator for Parallel Graph Processing", Proceedings of the International Symposium on Computer Architecture, Jun. 13-17, 2015, 13 pgs., ACM, Portland, OR, USA.
Aingaran, K. et al., "Software in Silicon in the Oracle SPARC M7 Processor" Presented at Hot Chips, Aug. 21-23, 2016, 31 pgs., Cupertino, CA, USA.
One, Aleph, "Smashing the Stack for Fun and Profit", Phrack 49, Nov. 8, 1996, 25 pgs., vol. 7, Issue 49, Phrack Magazine, USA.
Anderson, J. P., "Computer Security Technology Planning Study", Technical Report ESD-TR-73-51, U.S. AirForce Electronic Systems Division, Oct. 1972, 142 pgs., vol. II, Fort Washington, PA, USA.
Andryeyev, G., "OpenCL with AMD FirePro W900" Presented at Toronto SIGGRAPH, Nov. 2-5, 2015, 25 pgs., AMD, Kobe, JP. (Retrieved from: http://toronto.siggraph.org/wp-content/uploads/2015/05/uoft-ocl.pdf).
Akritidis, P. et al., "Baggy Bounds Checking: An Efficient and Backwards-Compatible Defense against Out-of-Bounds Errors", In Proceedings of the USENIX Security Symposium, Aug. 10-14, 2009, p. 51-100, Montreal, CA.
Margiolas, C. et al., "Portable and Transparent Host-Device Communication Optimization for GPGPU Environments," Proceedings of the Int'l Symp. on Code Generation and Optimization, Feb. 15-19, 2014, pp. 55-65, ACM, Orlando, FL, USA.
Bessey, A. et al., "A Few Billion Lines of Code Later: Using Static Analysis to Find Bugs in the Real World," Communications of the ACM, Feb. 2010, pp. 66-75, vol. 53, Issue 2, ACM, New York, NY, USA.

Bosman, E. et al., "Minemu: The World's Fastest Taint Tracker," Recent Advances in Intrusion Detection, Proceedings of the 14th International Symposium, Sep. 20-21, 2011, pp. 1-20, Menlo Park, CA, USA.
Brookwood, Nathan, "Everything You Always Wanted to Know About HSA But Were Afraid to Ask," Oct. 2013, 8 pgs., White Paper, USA.
Bruening, D. et al., "Practical Memory Checking with Dr. Memory," Proceedings of the 9th Annual IEEE/ACM International Symposium on Code Generation and Optimization, Apr. 2-6, 2011, pp. 213-223, IEEE Computer Society, Washington, DC, USA.
Che, S. et al., "Rodinia: A Benchmark Suite for Heterogeneous Computing," Proceedings of the 2009 IEEE International Symposium on Workload Characterization, Oct. 4-6, 2009, pp. 44-54, IEEE Computer Society, Washington, DC, USA.
Che, S. et al., "Pannotia: Understanding Irregular GPGPU Graph Applications," Proceedings of 2013 IEEE International Symposium on Workload Characterization, Sep. 22-24, 2013, pp. 185-195, IEEE, Portland, OR, USA.
Chen, T. et al., "DianNao: A Small-Footprint High-Throughput Accelerator for Ubiquitous Machine-Learning," Proceedings of the 19th International Conference on Architectural Support for Programming Languages and Operating Systems, Mar. 1-5, 2014, pp. 269-284, ACM, Salt Lake City, UT, USA.
Clemons, J. et al., "EVA: An Efficient Vision Architecture for Mobile Systems," Proceedings of the 2013 International Conference on Compilers, Architectures and Synthesis for Embedded Systems, Sep. 29-Oct. 4, 2013, 10 pgs., Article No. 13, IEEE, Montreal, QC, CA.
Codrescu, L., "Qualcomm Hexagon DSP: An Architecture Optimized for Mobile Multimedia and Communications," Presented at Hot Chips: A Symposium on High Performance Chips, Aug. 25-27, 2013, 23 pgs., Palo Alto, CA, USA.
Coombs, J. et al., "OpenCV on TI's DSP+ARM Plallorms: Mitigating the Challenges of Porting OpenCV to Embedded Platforms," Jul. 2011, 12 pgs., Texas Instruments White Paper, USA.
Cowan, C. et al., "StackGuard: Automatic Adaptive Detection and Prevention of Buffer-Overflow Attacks," Proceedings of the 7th USENIX Security Symposium, Jan. 26-29, 1998, 15 pgs., San Antonio, TX, USA.
Danalis, A. et al., "The Scalable Heterogeneous Computing (SHOC) Benchmark Suite," Proceedings of the 3rd Workshop on General-Purpose Computation on Graphics Processing Units, Mar. 14, 2010, pp. 63-74, ACM, Pittsburgh, PA, USA.
Dang, T. et al., "The Performance Cost of Shadow Stacks and Stack Canaries," Proceedings of the 10th ACM Symposium on Information, Computer and Communications Security, Apr. 14-17, 2015, pp. 555-566, ACM, Singapore.
Devietti, J. et al., "HardBound: Architectural Support for Spatial Safety of the C Programming Language," Proceedings of the 13th International Conference on Architectural Support for Programming Languages and Operating Systems, Mar. 1-5, 2008, pp. 103-114, ACM, Seattle, WA, USA.
Ditty, M. et al., "Nvidia's Tegra K1 System-on-Chip," Presented at Hot Chips: A Symposium on High Performance Chips, Aug. 10-12, 2014, 26 pgs., ACM, Cupertino, CA, USA.
Doweck, J. et al., "Inside 6th Generation Intel Core: New Microarchitecture Code Named Skylake," Presented at Hot Chips: A Symposium on High Performance Chips, Aug. 21-23, 2016, 39 pgs., ACM, Cupertino, CA, USA.
Eigler, F., "Mudflap: Pointer Use Checking for C/C++," Proceedings of the GCC Developers Summit, May 25-27, 2003, pp. 57-70, Ottawa, ON, CA.
Elteir, M. et al., "StreamMR: An Optimized MapReduce Framework for AMD GPUs," Proceedings for the 17th IEEE International Conference on Parallel and Distributed Systems, Dec. 7-9, 2011, 8 pgs., IEEE, Tainan, TW.
Feng, W. et al., "OpenCL and the 13 Dwarfs: A Work in Progress," Proceedings of the 3rd ACM/SPEC International Conference on Performance Engineering, Apr. 22-25, 2012, pp. 291-294, ACM, Boston, MA, USA.

(56) References Cited

OTHER PUBLICATIONS

Grauer-Gray, S. et al., "Auto-tuning a High-Level Language to GPU Codes," Innovative Parallel Computing, May 13-14, 2012, 10 pgs., San Jose, CA, USA.
Harris, M. et al., "CUDA 8 and Beyond," Presented at the NVIDIA GPU Technology Conference, Apr. 4-7, 2016, 39 pgs., San Jose, CA, USA.
Hasabnis, N. et al., "Light-weight Bounds Checking," Proceedings of the Tenth International Symposium on Code Generation and Optimization, Mar. 31-Apr. 4, 2012, pp. 135-144, ACM, San Jose, CA, USA.
HSA Foundation, "Heterogenous System Architecture" Retrieved from: http://www.hsafoundation.com on Feb. 13, 2017.
Intel Corp., "Introduction to Intel Memory Protection Extensions," Technical Report, Jul. 16, 2013, 4 pgs.. Retrieved from: https://software.intel.com/en-us/articles/introduction-to-intel-memory-protection-extensions on Feb. 12, 2017.
Intel Corp., "Intel Inspector 2017," 5 pgs., Retrieved from: https://software.intel.com/en-us/intel-inspector-xe on Feb. 12, 2017.
Khronos Group, "WebCL Validator," https://github.com/KhronosGroup/webcl-validator, 2014, 4 pgs. Accessed Feb. 13, 2017.
Krishnan, G. et al., "Energy Efficient Graphics and Multimedia in 28nm Carrizo APU," Presented at Hot Chips: A Symposium on High Performance Chips, Aug. 23-25, 2015, 34 pgs., ACM, Cupertino, CA, USA.
Larabel, M. et al., "Phoronix Test Suite," http://www.phoronix-test-suite.com, 2011, 5 pgs. Accessed Feb. 13, 2017.
Lepisto, M. et al., "WebCL Memory Protection: Source-to-Source Instrumentation," http://learningwebcl.com/wp-content/uploads/2013/11/WebCLMemoryProtection.pdf, 2013, 32 pgs. Accessed Feb. 13, 2017.
Lewis, B. T., "Performance and Programmability Trade-offs in the OpenCL 2.0 SVM and Memory Model," Presented at the 5th Workshop on Determinism and Correctness in Parallel Programming, Mar. 1-5, 2014, 39 pgs., Salt Lake City, UT, USA.
Luk, C. et al., "Pin: Building Customized Program Analysis Tools with Dynamic Instrumentation," Proceedings of the Conference on Programming Language Design and Implementation, Jun. 12-15, 2005, pp. 190-200, ACM, Chicago, IL, USA.
Lvin, V. et al., "Archipelago: Trading Address Space for Reliability and Security," Proceedings of the 13th International Conference on Architectural Support for Programming Languages and Operating Systems, Mar. 1-5, 2008, 10 pgs., ACM, Seattle, WA, USA.
Perens, B. "Electric Fence Malloc Debugger," http://linux.die.net/man/3/efence, 1987, 7 pgs., Berkeley, CA, USA. Accessed Feb. 13, 2017.
Meer, H., "Memory Corruption Attacks: The (almost) Complete History," BlackHat USA, Jun. 25, 2010, 35 pgs. Thinkst Applied Research, USA.
Micro Focus, "BoundsChecker," http://www.borland.com/en-GB/Products/Software-Testing/Automated-Testing/Devpartner-Studio, 2016, 8 pgs. Accessed Feb. 13, 2017.
Miele, Andrea, "Buffer Overflow Vulnerabilities in CUDA: A Preliminary Analysis," Journal of Computer Virology and Hacking Techniques, May 2016, pp. 113-120, vol. 12, Issue 2, Springer Paris, USA.
Mukherjee, S. et al., "Exploring the Features of OpenCL 2.0," Proceedings of the 3rd International Workshop on OpenCL, May 12-13, 2015, 4 pgs., Article No. 5, ACM, Palo Alto, CA, USA.
Nagarakatte, S. et al., "SoftBound: Highly Compatible and Complete Spatial Memory Safety for C," Proceedings of the 30th ACM SIGPLAN Conference on Programming Language Design and Implementation, Jun. 15-21, 2009, pp. 245-258, ACM, Dublin, Ireland.
Nethercote, N. et al., "Valgrind: A Framework for Heavyweight Dynamic Binary Instrumentation," Proceedings of the 28th ACM SIGPLAN Conference on Programming Language Design and Implementation, Jun. 10-13, 2007, pp. 89-100, ACM, San Diego, CA, USA.
Newsome, J. et al., "Dynamic Taint Analysis for Automatic Detection, Analysis, and Signature Generation of Exploits on Commodity Software," Proceedings of the 12th Annual Network and Distributed System Security Symposium, Feb. 3-4, 2005, 17 pgs., San Diego, CA, USA.

\* cited by examiner

DETECTING BUFFER OVERFLOWS IN GENERAL-PURPOSE GPU APPLICATIONS

BACKGROUND

Memory buffers are typically used to temporarily store related data (e.g., a plurality of social security numbers) in a contiguous address space or collection of contiguous memory regions to facilitate efficient access of the related data during execution of a program. The buffers are implemented in portions of physical memory as well as virtual memory (i.e., in software) which include memory regions having virtual addresses mapped to physical addresses of the physical memory.

Typically, the size of a memory buffer is not checked when the buffer is accessed (i.e., the related data is written to the buffer), allowing accesses to memory regions outside (e.g., adjacent to) the buffer. As a result of an address calculation exceeding the bounds of a buffer, data is written to the memory regions outside the buffer resulting in a buffer overflow. Buffer overflows contribute to a variety of undesirable events, such as program crashes, data corruption, and security issues.

BRIEF DESCRIPTION OF THE DRAWINGS

A more detailed understanding can be had from the following description, given by way of example in conjunction with the accompanying drawings wherein.

DETAILED DESCRIPTION

Conventional buffer overflow detection methods include adding extra checks into a program to validate individual memory accesses. A compiler adds, for example, extra checking instructions around buffer accesses. These conventional buffer overflow detection methods often lead to complex compiler changes and large overhead, such as for example, slowing program execution (i.e., execution time overhead), using more power, and reducing application energy efficiency.

Further, heterogeneous processing systems, which include different processor types (e.g., CPU and GPU), continue to develop tighter integration of memory sharing between processor types, including integration of physical as well as virtual memory sharing. This leads to increased risk of buffer overflows caused by data processed by one processor type (e.g., GPU) corrupting data to be processed by a second processor type (e.g., CPU).

The present application provides apparatuses and methods for efficient buffer overflow detection. Function calls which allocate memory regions to memory buffers (e.g., OpenCL memory buffers) are identified and additional memory regions (e.g., canary regions) are added adjacent to the memory buffers (e.g., before an address at the beginning of the buffer or after an address at the end of the buffer). Known values are stored into the additional memory regions. The extended regions are then monitored to determine changes to the known values. Buffer overflows (e.g., related data intended for the buffer is written outside the buffer) are detected when changes to the known values are determined. Indications of data written outside the buffer, as well as information used to facilitate debugging of the data written outside the buffer, are provided when the buffer overflows are detected. The apparatuses and methods also allow execution overhead to scale with the number of buffers used during execution.

Apparatuses and methods disclosed herein detect buffer overflow caused by accelerator kernels (e.g., OpenCL kernels, CUDA kernels, C++AMP or OpenMP device-side work). Application program interface (API) calls are wrapped in order to gather information about the buffers (e.g., base address, lengths), and indications are provided for writes outside of a memory buffer. The buffer overflow detection methods disclosed herein can utilize parallelism afforded by accelerated processors (e.g., compute units of a GPU) to perform checks quickly and with decreased bus accesses. Buffer overflow detection can slow down the program (i.e., cause execution time overhead), use more power, and reduce application energy efficiency. The apparatuses and methods presented herein allow these overheads to scale with the number of buffers used during execution.

A processing apparatus is provided that includes a memory and an accelerated processing device. The memory includes a plurality of memory regions each corresponding to one of a plurality of memory addresses and configured to store data associated with the one memory address. The accelerated processing device includes a plurality of processors each in communication with the memory. The accelerated processing device is configured to determine a request to allocate an initial memory buffer comprising a number of contiguous memory regions, create a new memory buffer comprising one or more additional memory regions adjacent to the contiguous memory regions of the initial memory buffer, assign one or more values to the one or more additional memory regions and detect a change to the one or more values at the one or more additional memory regions.

A computer implemented method is provided that includes storing data in a plurality of memory regions each corresponding to one of a plurality of memory addresses and each in communication with a plurality of processors. The method also includes determining a request to allocate an initial memory buffer comprising a number of contiguous memory regions and creating a new memory buffer comprising one or more additional memory regions adjacent to the contiguous memory regions of the initial memory buffer. The method further includes assigning one or more values to the one or more additional memory regions and detecting a change to the one or more values at the one or more additional memory regions.

A non-transitory computer readable medium is provided that includes instructions for causing a computer to execute a method of buffer overflow detection. The instructions comprise storing data in a plurality of memory regions each corresponding to one of a plurality of memory addresses and each in communication with a plurality of processors, determining a request to allocate an initial memory buffer comprising a number of contiguous memory regions, creating a new memory buffer comprising one or more additional memory regions adjacent to the contiguous memory regions of the initial memory buffer, assigning one or more values to the one or more additional memory regions, detecting a change to the one or more values at the one or more additional memory regions.

As used herein, programs include sequences of instructions to be executed using one or more processors to perform procedures or routines (e.g., operations, computations, functions, processes, jobs). Processing of programmed instructions includes one or more of a plurality of processing stages, such as but not limited to fetching, decoding, scheduling for execution and executing the programmed instructions. Programmed instructions include store instructions which, when executed, store data resulting from their execution (also referred to hereinafter as output) from registers to memory.

Figure 1:
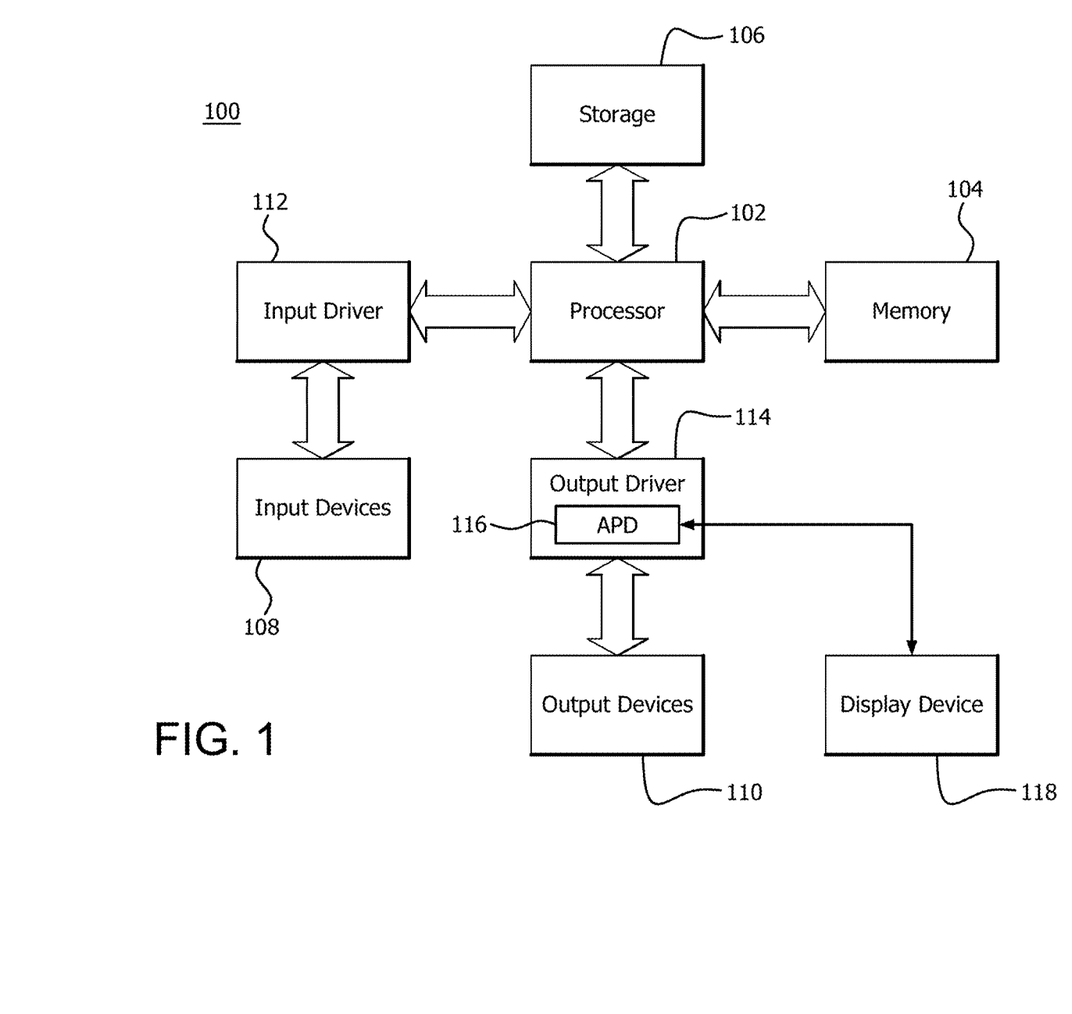
FIG. 1 is a block diagram of an example device in which buffer overflow detection is implemented.

FIG. 1 is a block diagram of an exemplary device 100. The device 100 includes, for example, a computer, a gaming device, a handheld device, a set-top box, a television, a mobile phone, or a tablet computer. As shown in FIG. 1, exemplary device 100 includes a processor 102, memory 104, a storage 106, one or more input devices 108, one or more output devices 110, an input driver 112 and an output driver 114. It is understood that the device 100 can include additional components not shown in FIG. 1.

Exemplary processor types for processor 102 include a CPU, a GPU, an accelerated processing device, a CPU and GPU located on the same die, or one or more processor cores, wherein each processor core is a CPU or a GPU. Memory 104 is, for example, located on the same die as the processor 102 or located separately from the processor 102. Exemplary memory types for memory 104 include a volatile memory, a non-volatile memory, for example, random access memory (RAM), dynamic RAM, a cache, a memory buffer, physical memory.

Exemplary storage types for storage 106 include a fixed or removable storage, for example, a hard disk drive, a solid state drive, an optical disk, or a flash drive. Exemplary input device types for input device 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). Exemplary output device types for output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 is an optional component (indicated by dashed lines) and that the device 100 will operate in the same manner if the input driver 112 is not present.

Figure 2:
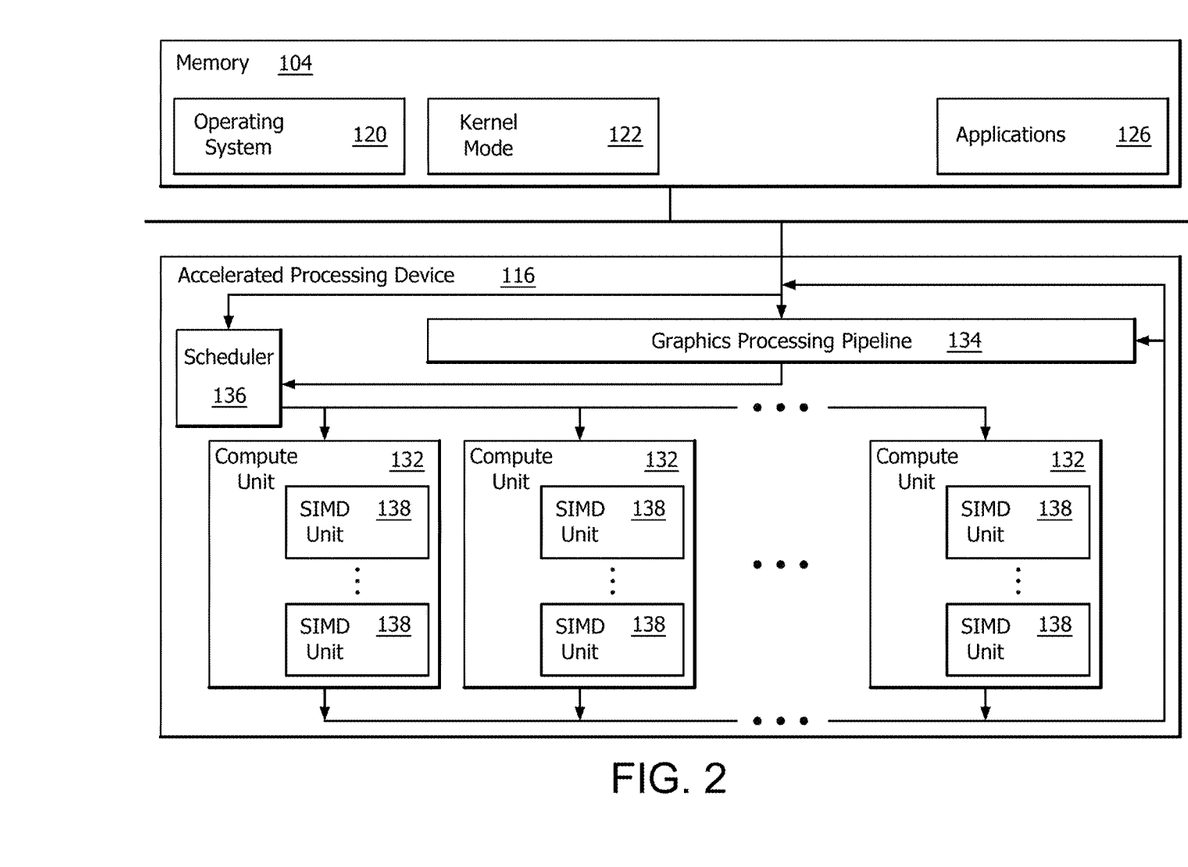
FIG. 2 is a block diagram of exemplary processing apparatus components used to implement buffer overflow detection.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various aspects of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an API to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that are suited for parallel processing. The APD 116 is, for example, used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

Exemplary processor types for APD 116 include a CPU, a GPU, a CPU and GPU located on the same die, or one or more processor cores (i.e., compute units) 132 wherein each processor core is a CPU or a GPU. Each compute unit (i.e., compute core) 132 includes one or more SIMD units 138 each configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes are, for example, switched off with predication if not all lanes need to execute a given instruction. Predication is also used, for example, to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items are, for example, executed simultaneously as a "wavefront" on a single SIMD processing unit 138. Multiple wavefronts are, for example, included in a "work group," which includes a collection of work-items designated to execute the same program. A work group is, for example, executed by executing each of the wavefronts that make up the work group. The wavefronts are, for example, executed sequentially on a single SIMD unit 138 or partially or fully in parallel on different SIMD units 138. Wavefronts are thought of, for example, as the largest collection of work-items executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. A graphics pipeline 134 which accepts graphics processing commands from the processor 102 provides computation tasks to the compute units 132 to be executed, for example, in parallel by the compute units 132.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figures 3A, 3B:
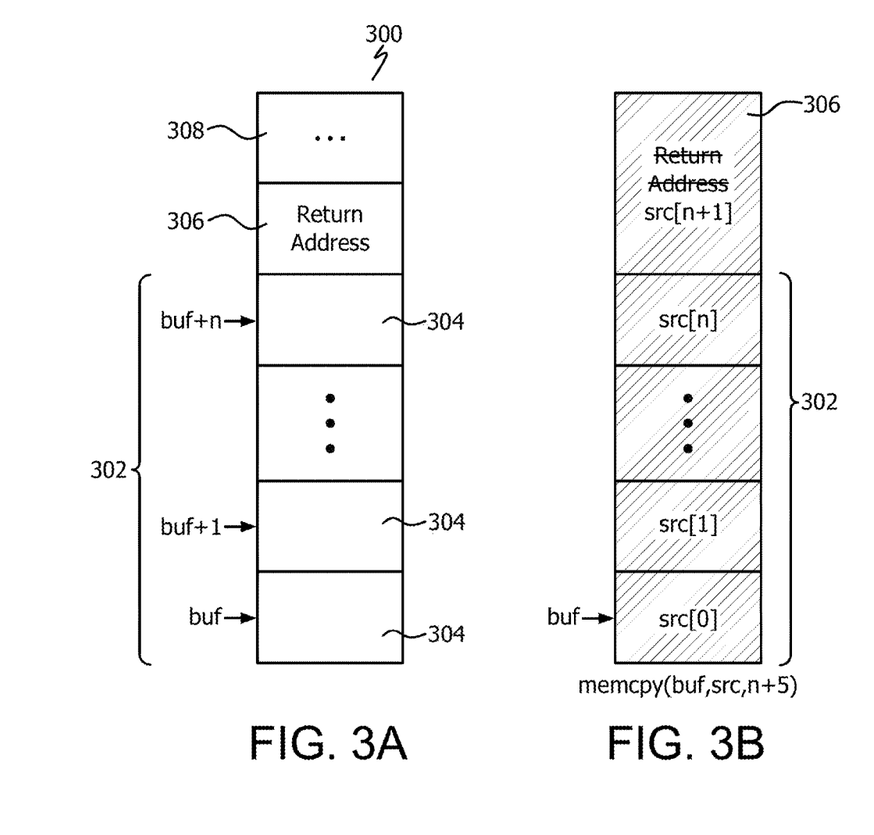
FIGS. 3A and 3B are diagrams of a memory portion, including a memory buffer, used to illustrate exemplary memory buffer overflow.

FIGS. 3A and 3B are diagrams of a memory portion 300, including a memory buffer 302, used to illustrate exemplary memory buffer overflow. Memory portion 300 is, for example, a non-volatile portion of memory 104 shown in FIGS. 1 and 2. As shown in FIG. 3A, memory buffer 302 includes a plurality of buffer memory entries 304 beginning with entry "buf" (corresponding to a first address of the buffer memory portion 300) and ending with entry "buf+n" (corresponding to a last address of the buffer memory portion 300). As shown in FIG. 1, entries 306 and 308 are outside the buffer 302, with entry 306 being the entry adjacent to the last entry "buf+n." Each entry in the exemplary memory portion 300 corresponds to a region of memory (e.g., physical memory region or virtual memory region) and includes a memory address and data associated with the memory address.

Buffer overflows occur when related data (e.g., a plurality of social security numbers) intended to be stored in a buffer (e.g., buffer 302) is written to one or more memory regions (e.g., regions corresponding to entries 306 and 308 in FIG. 3A) outside of (e.g., adjacent to) the memory buffer. For example, overflows occur when related data for a buffer is written to one or more memory regions after a last entry (e.g., at entry 308 after entry "buf+n") as shown in FIG. 3A or at one or more regions (not shown) prior to a region corresponding to entry "buf" shown in FIG. 3A. Buffer overflows result from a variety of causes, such as incorrect programming instructions, exceeding a data limit (e.g., defined in a program) to be accessed in a program, or a hacker giving an input to the program that is larger than the predefined buffer meant to hold that input.

Buffer overflows result in values being written into regions outside the buffer which are not associated with the regions outside the buffer. Because of this disassociation, buffer overflows contribute to conditions which cause program crashes, data corruption, and security issues. An example of one of these buffer overflow conditions is illustrated in FIGS. 3A and 3B, in which a return address of a function is overwritten due to a memory buffer overflow. The buffer overflow condition shown in FIGS. 3A and 3B is merely exemplary. Other examples of memory buffer overflows, which contribute to conditions which cause program crashes, data corruption or create security issues, include but are not limited to pointer corruption (e.g., re-directs memory accesses to reserved or inaccessible memory locations, resulting in program crashes), data corruption (e.g., incorrectly altering control flow or program output results), and function pointer corruption (e.g., leading to jumps to an unexpected segment of a program's execution).

As shown in FIG. 3A, a first variable, corresponding to the array of entries at memory regions 304 of buffer 302, is allocated adjacent to the entry at memory region 306, which includes a second variable (i.e., the return address of the function).

As described above, buffer overflows result in values being written into regions outside the buffer which are not associated with the regions outside the buffer. For example, the regions in memory buffer 302 are allocated for related data (corresponding to "src") for n+1 number of entries. As shown in FIG. 3B, when the related data intended for buffer 302 is written to more than [n+1] number of entries, a buffer overflow occurs and the return address is overwritten by data (i.e., src[n+1]). The entries do not need to be accessed in a sequential order, however, in order for an overflow to occur. That is, a buffer overflow also occurs, for example, when memory adjacent to the buffer is accessed unintentionally or deliberately without accessing the buffer in sequential order (e.g., without accessing the buffer in the order "buf, buf+1, buf+2, ... buf+n, buf+n+1"). Depending on the structure of the program, writes relative to this buffer address and outside of its boundaries are caused, for example, from other inputs.

Accordingly, the value src[n+1] written into the region 306 is not associated with the region 306 outside the buffer 302, resulting in one or more potentially problematic conditions (e.g., program crash, data corruption, or security issue). For example, when the data at region 306 is accessed a number of cycles after the buffer overflow occurs, incorrect data (i.e., data originally from src[n+1]) is accessed because the expected return address value is not at region 306. The access of the incorrect data results, for example, in an error (e.g., the program returning to an incorrect location and running erroneous code) which is difficult to observe and debug because the error manifests in ways or at locations unrelated to the buffer. By detecting the buffer overflow (e.g., detecting a change to a canary value) and providing an indication of the buffer overflow before the erroneous usage causes a crash or data corruption, the cause (i.e., the buffer overflow) of the error is more easily determined and results in less overhead than waiting until the occurrence of the error.

When the buffer overflow is determined after a kernel executing on a processor of one type (e.g., GPU or other accelerator) completes execution but before any additional instruction are executed on a processor of another type (e.g., CPU), the occurrence of the buffer overflow is determined within seconds (e.g., within 5 seconds) after the overflow occurs depending on the speed of the processor of the other type implementing the detection of the change to the canary values. Accordingly, the overflow occurrence is determined before an occurrence of problematic condition (e.g., program crash, data corruption, or security issue) resulting from the overflow.

When the buffer overflow is determined, due to the detection of the changed canary values, after a kernel executing on a processor of one type (e.g., GPU or other accelerator) completes execution, but asynchronously, while additional instructions are executing on a processor of another type (e.g., CPU), the occurrence of the buffer overflow is determined within a longer time range (e.g., within days) after the overflow occurs than in the shorter time range describe above. Determination of the overflow within this longer time range, however, provides for easier identification of a cause (i.e., the overflow) of a potentially problematic condition (e.g., program crash, data corruption, or security issue) and potentially more useful debugging information than in situations in which the problematic condition does not arise for months or years after the occurrence of the overflow. For example, when, data corruption, such as a changed value in a database used for an annual financial report, resulting from a buffer overflow is determined months or years after the overflow, it becomes difficult to trace the error back to its cause (i.e. the overflow).

Figure 3C:
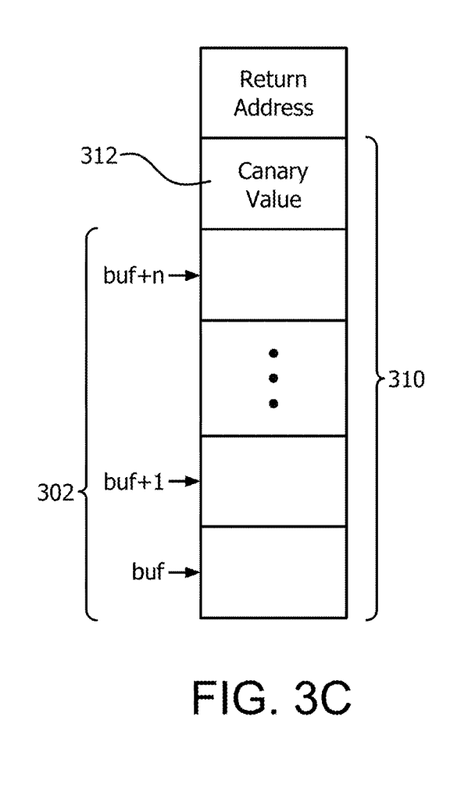
FIG. 3C is a diagram illustrating an exemplary new memory buffer which includes an additional memory region adjacent to the contiguous memory regions of the initial memory buffer.

As shown in FIG. 3C, a new memory buffer 310 is created which includes an additional memory region 312 adjacent to the contiguous memory regions 304 of the initial memory buffer 302. As shown in FIG. 3C, a canary value is stored at additional memory region 312 after the entry "buf+n" of buffer 302. Additional memory regions which store canary values, however also include one or more regions before the "buf" entry of buffer 302. The canary value is a known or calculable value that is monitored to determine if and when the value changes. After the related data (src[0]-src[n+1]) is copied, for example as shown in FIG. 3B, to buffer 302, but before the related data (src[0]-src[n+1]) is further used (e.g., accessed) by a program, it is determined (e.g., by processor 102) whether the value in the canary region has changed. When a change to the canary value is detected, a buffer overflow is determined.

As described above, this detected value change is performed: (i) asynchronously, in which work to perform the detection is assigned to one processor type (e.g., GPU) while the original program or application continues executing on another processor type (e.g., continues executing on the CPU) or (ii) after a kernel executing on a processor of one type (e.g., GPU or other accelerator) completes execution but before any additional instruction are executed on a processor of another type.

Because the value changes are detected, procedures for correcting (i.e., debugging) errors resulting from the buffer overflow are, for example, less difficult, less time consuming and more efficient to implement. Examples of these procedures for correcting the errors associated with buffer overflow include increasing the size of the buffer, limiting the amount of data stored in the buffer, modifying code, and checking for particular inputs to determine if a hack has occurred.

Buffer overflow detection includes, for example, detection of overflow of buffers associated with memories shared by a plurality of processor types, such as processors of APD 116. Detection of a buffer overflow of a buffer allocated to a first processor type (e.g., a GPU) is used to prevent undesirable conditions to the first processor type, such as the injection of code (i.e., hacking) to control operation of the first processor type (e.g., operation of the GPU). Detection of a buffer overflow of a buffer allocated to the first processor type (e.g., the GPU) is also used to prevent undesirable conditions to the second processor type (e.g., the CPU) having buffers accessible by the GPU (e.g., via interconnects), such as data corruption in CPU memory from a buffer overflow in a GPU kernel.

Buffer overflow detection includes dynamically switching between detecting buffer overflows of buffers of different processor types, such as a GPU (or other accelerator) and a CPU. A plurality of requests to allocate initial memory buffers is determined, for example, each comprising contiguous memory regions allocated to one of a processor of a first type (e.g., GPU) and a processor of a second type (e.g., CPU). A plurality of new memory buffers are created, each comprising one or more additional memory regions adjacent to contiguous memory regions allocated to the processor of the first type or the processor of the second type. Values (e.g., canary values) are assigned to the additional memory regions of the new memory buffers. A processor (e.g., APD 116) dynamically determines switching between detection of buffer overflows of the different processor types by, for example switching between (i) a first detection process of detecting a change to one or more values of corresponding additional memory regions allocated to the processor of the first type (e.g., GPU) and (ii) a second detection process of detecting a change to one or more values of corresponding additional memory regions allocated to the processor of the second type (e.g., CPU). The overflow of each of the new memory buffers is determined (e.g., by APD 116 or by a user upon being provided an indication of the detected overflow), for example, based on the detected changes to the values of the corresponding additional memory regions allocated to the processor of the first type and the second type. It is understood that switching is performed between any number of processors of different types.

Switching between the first detection process and the second detection process includes, for example, determining: (i) a first estimated time to detect the change to the one or more values of the one or more corresponding additional memory regions allocated to the processor of the first type; and (ii) a second estimated time to detect the change to the one or more values of the one or more corresponding additional memory regions allocated to the processor of the second type.

The determination of the first estimated time and the second estimated time is, for example, based on at least one of: (i) a number of the initial buffers allocated to the processor of the first type; (ii) a number of the initial buffers allocated to the processor of the second type; (iii) an identification of the processor of the first type; (iv) an identification of the processor of the second type, (v) whether the image is a flat memory region of a multi-dimensional image type, (vi) the size of the buffers, (vii) the size of the canary regions, (viii) the speed of the connection between the processors, and (ix) the estimated performance of each of the processors.

Based on the first estimated time and the second estimated time, a determination is made as to whether to: (i) detect the change to the one or more values of the one or more corresponding additional memory regions allocated to the processor of the first type or (ii) detect the change to the one or more values of the one or more corresponding additional memory regions allocated to the processor of the second type. For example, a determination is made to detect the change to the one or more values of the one or more corresponding additional memory regions allocated to the processor of the first type when the first estimated time is equal to or less than the second estimated time. Alternatively, a determination is made to detect the change to the one or more values of the one or more corresponding additional memory regions allocated to the processor of the second type when the first estimated time is greater than the second estimated time.

The APD 116 dynamically determines the switching based on one or more factors, such as for example, a number of initial buffers allocated to the processor of the first type and the second type. The number of initial buffers is used to determine the switch, for example, by comparing the number of buffers of each type to each other or a threshold. The one or more factors also include, for example, an identification of the processor of the first type and the second type (e.g., whether a processor is a CPU, a GPU, or another type of accelerator). Other factors for dynamically determining the switching include the use of a memory region (e.g. whether the region holds a flat buffer or a multi-dimensional image), the size of a buffer, the size of the additional memory regions, the speed of any connections between the processor types, and the estimated performance of each of the processors.

The APD 116 is configured to perform any of the tasks described above based on estimations of overheads (e.g., runtimes, bus transfer times, and storage sp ace).

In applications such as those that use the OpenCL programming standard, "Global" buffers are typically first allocated, using functions (e.g., "clCreateBuffer" or "clCreateImage"), into a first processor (e.g., GPU) memory without pointers, but stored, for example, into memory associated with a second processor (e.g., CPU), which accesses the OpenCL buffer from the GPU by copying the data into its memory (e.g., memory associated with the CPU). These buffers are also stored, for example, in the memory of the first processor (e.g. GPU) and accessed by the second processor (e.g. CPU) and additionally or alternatively in the memory of the second processor (e.g. CPU) and directly accessed by the first processor (e.g. GPU). Accordingly, buffer overflow detection methods and apparatuses described herein include detection of buffer overflows in these memory portions by wrapping calls to functions that create memory buffers and expanding the requested size to include additional portions (e.g., canary regions).

Shared virtual memory (SVM) includes memory buffers associated with a processor (e.g., GPU) which contains, for example, pointers to their own buffer and to other SVM buffers associate with another processor (e.g., CPU). Coarse-grained SVM buffers are mapped into CPU memory to access the buffers on the CPU. When the buffer is mapped to one processor type (e.g. GPU) or another (e.g. CPU), the pointers remain valid. Fine-grained SVM buffers contain pointers that are valid on both the CPU and the GPU without using manual mapping. Accordingly, buffer overflow detection methods and apparatuses described herein monitors buffer overflows in these regions by wrapping calls to SVM buffers and expanding the requested allocation size to include additional portions (e.g., canary regions).

Images include memory buffers associated with a processor (e.g., GPU) which represents multi-dimensional data. For example, when a 2D image is accessed by giving the horizontal and vertical coordinates into the image, calculations are performed, via hardware or software) to decide where the address is located in the image buffer. Multi-dimensional images include, for example, buffer overflows within the image. An overflow address is, for example, calculated to be lying within the buffer even when a row overflow occurs. Accordingly, buffer overflow detection methods and apparatuses described herein monitor buffer overflows in these regions by wrapping calls to image buffer creation and kernels that use images to expand the requested allocation size to include additional portions (e.g., canary regions), potentially by expanded the image to include canaries in multiple dimensions.

Figure 4:
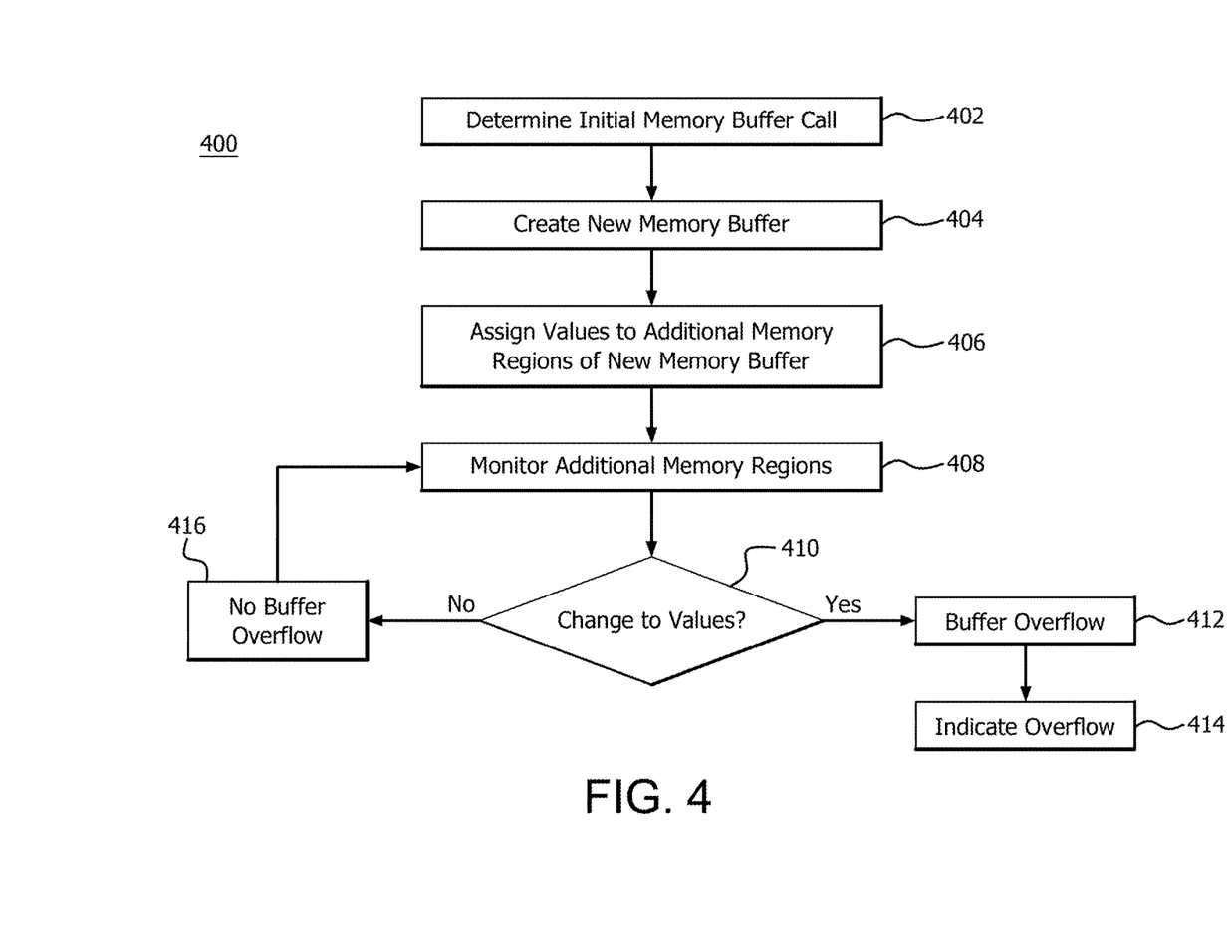
FIG. 4 is a flow diagram illustrating an exemplary method of buffer overflow detection.

FIG. 4 is a flow diagram illustrating an exemplary method 400 of buffer overflow detection. As shown in block 402 of method 400, a call to allocate an initial buffer memory is determined. For example, the call is made to allocate an initial memory buffer of a certain size (e.g., memory buffer of size 100 entries) having a number of contiguous memory regions, such as for example, memory regions "buf" to "buf+n" shown in FIG. 1A.

When the detected buffer is limited to a fixed size (e.g., a configuration flag preventing resizing of the memory buffer), an extended shadow copy of the buffer is created, the copy is extended with the additional regions, and, upon completion of the kernel, the data in the shadow buffer (but not in the canary regions) is copied back to the original host memory portion. For example, OpenCL allows OpenCL implementations to cache buffer contents of host pointer regions. Accordingly, the buffer updates are cached until after the canary values of the additional regions are monitored for changes.

Information about the new memory buffer is stored in memory. The information includes, for example, information indicating the addresses of the additional memory regions having the assigned canary values, information indicating the canary values, information indicating limitations for the canary values, and information indicating whether the memory buffer is a write buffer or read buffer. It should be understood that many variations are possible based on the disclosure herein. Although features and elements are described above in particular combinations, each feature or element is, for example, used alone without the other features and elements or in various combinations with or without other features and elements.

The call to allocate the initial buffer memory is determined, for example, by determining when an API call is made. Monitoring of the API calls to libraries varies by operating systems. For example, some operating systems utilize shimming or library interposing mechanisms to implement API wrappers. The API calls used to allocate memory buffers are different for each library implementation (e.g., OpenCL, CUDA or other library). For example, for OpenCL implementation, function calls to buffer creation APIs (e.g., "clSVMAlloc, "clCreateBuffer," and "clCreateImage") are monitored. APIs that are used to assign arguments to OpenCL kernels (e.g., "clSetKernelArg" and "clSetKernelArgSVMPointer") are detected, using the information about each new memory buffer, as described above. A list of each buffer accessible by each kernel is stored and used when the kernel is launched to know which buffers are monitored for overflows. For each global memory buffer argument, a list of buffer sizes, canary values, and pointers to the buffers' meta-data is maintained.

As shown in block 404 of method 400, when the call to allocate the initial memory buffer is detected, a new memory buffer, such as buffer 310 shown in FIG. 3C, is created by allocating one or more additional memory regions, such as region 312 in FIG. 3C, adjacent to the contiguous memory regions 302 of the initial memory buffer 302. For example, a new memory buffer is allocated having a size (e.g., memory buffer of size 110 entries) that is larger than the size (e.g., memory buffer of size 100 entries) of an initial buffer. Accordingly, using this example, 5 additional regions are added adjacent to each end (e.g., before and after) the contiguous regions of the initial buffer. The contiguous regions are stored, for example, at the same portion of memory when 10 additional contiguous regions adjacent to the initial buffer are available and, alternatively, at a different portion of memory which has 110 contiguous regions available. It is understood that creation of new memory buffers includes creating buffers having any number of additional regions adjacent to initial memory buffers.

For multi-dimensional arrays (such as 2D images), canary regions are, for example, allocated at locations within the buffer that correspond to locations beyond the end of a row or column (e.g., a 2D image having multiple canary regions, such as regions beyond the end of rows and other regions beyond the end of columns).

As shown in block 406 of method 400, values are assigned to each of the one or more additional memory regions, such as region 312 shown in FIG. 3C. The assigned values are known or calculable canary values. The canary values assigned to each additional memory region are, for example, initialized with a known data pattern, initialized with the same values, or initialized with values different from each other.

As shown in block 408 of method 400, the one or more additional memory regions adjacent to the memory buffer are monitored and, at decision block 410, a determination is made as to whether a change occurs to the values at the additional memory regions. If a change of a value is determined to occur, a buffer overflow is determined to occur at block 412 and an indication of the determined buffer overflow is provided at block 414.

For example, the detector first analyzes the list of arguments associated with a kernel. If the kernel has no global memory buffers, the kernel cannot cause global memory buffer overflows. If buffers are passed to the kernel, however, the values of the additional regions are later verified as not being changed. If a buffer is allocated with a flag that indicates the memory region is not increasable in size (e.g., the memory region exists and includes useful values in adjacent regions which precludes expanding the buffer), temporary shadow copies, which contain space for the additional regions, are provided and assigned as kernel arguments. The kernel is launched and, while executing, a checker kernel (e.g., checks for changes in values) is enqueued that executes after the original kernel finishes. This checker kernel is implemented, for example, on processors of various types (e.g., CPUs or GPUs). This kernel verifies additional accessible regions of the memory buffers which were not accessed by the kernel.

SVM buffers add extra complexity. When any argument to a kernel is to an SVM buffer, other SVM buffers are accessed by the kernel because, for example, SVM regions contain pointers to SVM buffers that are not in the kernel argument list. As such, if a kernel's arguments give the kernel access to an SVM buffer, the additional regions for SVM buffers in the application are verified.

If a change of a value is not determined, a buffer overflow is not determined to occur at block 416 and monitoring of the additional memory regions is continued at block 408. For example, when a verification function determines an overflow, a message indicating the buffer overflow is displayed and, optionally, execution is halted. A debug message is provided which, for example, shows the kernel name, the argument name, and in which region of the additional regions the first corruption occurred. The function argument's name is determined by using a function, (e.g., "clGetKernelArgInfo") because the argument index of the overflow buffer is known.

Monitoring 408 is implemented, for example, on processors of various types (e.g., a CPU or a GPU). While accelerators run slower and take longer to check each canary value, depending on the number of canary values to check, bringing the canary values from the accelerator memory to CPU memory includes amortization of bus transfers. Because the relative location of the additional canary region checks affects the performance of the detector, buffer overflow detection also includes overhead associated with determining whether to monitor values in the additional memory regions of memory buffers allocated to on a first processor type (e.g., a CPU) or a second processor type (e.g., a GPU). The determination includes, for example, comparing the CPU and GPU overheads of checking canary values as we vary the number of buffers. Micro benchmarks are implemented, for example, to determine a series of parameters used at runtime to decide whether to check a series of canary regions on one processor type or another processor type. Checks on accelerators (e.g., GPUs) are performed, for example, asynchronously from other work in the program, allowing the checks to take place while other useful work proceeds on host processors (e.g., CPUs).

The methods provided include implementation in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors are, for example, manufactured by configuring a manufacturing process using the results of processed hardware description language (HDL) instructions and other intermediary data including netlists (such instructions capable of being stored on a computer readable media). The results of such processing are, for example, maskworks that are then used in a semiconductor manufacturing process to manufacture a processor which implements buffer overflow detection.

The methods or flow charts provided herein are, for example, implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing apparatus comprising:
   memory, comprising a plurality of memory regions each corresponding to one memory address of a plurality of memory addresses and configured to store data associated with the one memory address; and
   an accelerated processing device comprising a processor of a first type and a processor of a second type each in communication with the memory, the accelerated processing device configured to:
   determine a plurality of requests to allocate initial memory buffers, each comprising a number of contiguous memory regions allocated to one of: (i) the processor of the first type; and (ii) the processor of the second type;
   create a plurality of new memory buffers each comprising one or more additional memory regions adjacent to the contiguous memory regions allocated to one of: (i) the processor of the first type; and (ii) the processor of the second type;
   assign one or more values to the one or more additional memory regions; and
   switch between: (i) a first detection process of detecting a change to the one or more values at the one or more additional memory regions allocated to the processor of the first type; and (ii) a second detection process of detecting the change to the one or more values of the one or more corresponding additional memory regions allocated to the processor of the second type.

2. The processing apparatus of claim 1, wherein the accelerated processing device is further configured to determine the request to allocate the initial memory buffer by determining when a call is made to allocate the initial memory buffer.

3. The processing apparatus of claim 1, wherein the accelerated processing device is further configured to determine the request to allocate the initial memory buffer by determining when an application programming interface (API) call is made to allocate the initial memory buffer.

4. The processing apparatus of claim 1, wherein the accelerated processing device is further configured to determine an overflow of the memory buffer by detecting the change to the one or more values after the change to the one or more values occurs.

5. The processing apparatus of claim 4, wherein the accelerated processing device is further configured to provide an indication of the determined overflow of the memory buffer.

6. The processing apparatus of claim 1, wherein the value is a known or calculable canary value.

7. The processing apparatus of claim 1, wherein the accelerated processing device is further configured to create the new memory buffer by at least one of: (i) adding the one or more additional memory regions before the contiguous memory regions of the initial memory buffer; and (ii) adding the one or more additional memory regions after the contiguous memory regions of the initial memory buffer.

8. The processing apparatus of claim 1, wherein the accelerated processing device is further configured to switch between the first detection process and the second detection process by:
   determining: (i) a first estimated time to detect the change to the one or more values of the one or more corresponding additional memory regions allocated to the processor of the first type; and (ii) a second estimated time to detect the change to the one or more values of the one or more corresponding additional memory regions allocated to the processor of the second type.

9. The processing apparatus of claim 8, wherein the accelerated processing device is further configured to:
   detect the change to the one or more values of the one or more corresponding additional memory regions allocated to the processor of the first type when the first estimated time is equal to or less than the second estimated time; and
   detect the change to the one or more values of the one or more corresponding additional memory regions allocated to the processor of the second type when the first estimated time is greater than the second estimated time.

10. A computer implemented buffer overflow detection method comprising:
   storing data in a plurality of memory regions each corresponding to one of a plurality of memory addresses and each in communication with a processor of a first type and a processor of a second type;
   determining a plurality of requests to allocate initial memory buffers, each comprising a number of contiguous memory regions allocated to one of: (i) the processor of the first type; and (ii) the processor of the second type;
   creating a plurality of new memory buffers each comprising one or more additional memory regions adjacent to the contiguous memory regions allocated to one of: (i) the processor of the first type; and (ii) the processor of the second type;
   assigning one or more values to the one or more additional memory regions; and
   switching between: (i) a first detection process of detecting a change to the one or more values at the one or more additional memory regions allocated to the processor of the first type; and (ii) a second detection process of detecting the change to the one or more values of the one or more corresponding additional memory regions allocated to the processor of the second type.

11. The method of claim 10, further comprising determining the request to allocate the initial memory buffer by determining when a call is made to allocate the initial memory buffer.

12. The method of claim 10, further comprising determining the request to allocate the initial memory buffer by determining when an application programming interface (API) call is made to allocate the initial memory buffer.

13. The method of claim 10, further comprising determining an overflow of the memory buffer by detecting the change to the one or more values after the change to the one or more values occurs.

14. The method of claim 13, further comprising providing an indication of the determined overflow of the memory buffer.

15. The method of claim 10, wherein the value is a known or calculable canary value.

16. The method of claim 10, further comprising creating the new memory buffer by at least one of: (i) adding the one or more additional memory regions before the contiguous memory regions of the initial memory buffer; and (ii) adding the one or more additional memory regions after the contiguous memory regions of the initial memory buffer.

17. The method of claim 16, further comprising switching between the first detection process and the second detection process by:
   determining: (i) a first estimated time to detect the change to the one or more values of the one or more corresponding additional memory regions allocated to the processor of the first type; and (ii) a second estimated time to detect the change to the one or more values of the one or more corresponding additional memory regions allocated to the processor of the second type;
   detecting the change to the one or more values of the one or more corresponding additional memory regions allocated to the processor of the first type when the first estimated time is equal to or less than the second estimated time; and
   detecting the change to the one or more values of the one or more corresponding additional memory regions allocated to the processor of the second type when the first estimated time is greater than the second estimated time.

18. A non-transitory computer readable medium comprising instructions for causing a computer to execute a method of buffer overflow detection, the instructions comprising:
   storing data in a plurality of memory regions each corresponding to one of a plurality of memory addresses and each in communication with a processor of a first type and a processor of a second type;
   determining a plurality of requests to allocate initial memory buffer each comprising a number of contiguous memory regions allocated to one of: (i) the processor of the first type; and (ii) the processor of the second type;
   creating a plurality of new memory buffers each comprising one or more additional memory regions adjacent to the contiguous memory regions allocated to one of: (i) the processor of the first type; and (ii) the processor of the second type;

assigning one or more values to the one or more additional memory regions; and switching between: (i) a first detection process of detecting a change to the one or more values at the one or more additional memory regions allocated to the processor of the first type; and (ii) a second detection process of detecting the change to the one or more values of the one or more corresponding additional memory regions allocated to the processor of the second type.

* * * * *